(12) United States Patent
Parikh et al.

(10) Patent No.: US 7,293,157 B1
(45) Date of Patent: Nov. 6, 2007

(54) LOGICALLY PARTITIONING DIFFERENT CLASSES OF TLB ENTRIES WITHIN A SINGLE CACHING STRUCTURE

(75) Inventors: Vipul Y. Parikh, Union City, CA (US); Quinn A. Jacobson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 379 days.

(21) Appl. No.: 10/997,394

(22) Filed: Nov. 24, 2004
(Under 37 CFR 1.47)

(51) Int. Cl.
*G06F 12/08* (2006.01)

(52) U.S. Cl. .............. 711/207; 711/206; 711/216; 711/209; 711/147; 711/153

(58) Field of Classification Search .......... 711/207, 711/147, 153, 206, 209, 216
See application file for complete search history.

(56) References Cited

U.S. PATENT DOCUMENTS

| | | | | |
|---|---|---|---|---|
| 4,215,402 A | * | 7/1980 | Mitchell et al. | 711/216 |
| 4,797,814 A | * | 1/1989 | Brenza | 711/3 |
| 5,526,504 A | * | 6/1996 | Hsu et al. | 711/207 |
| 5,713,001 A | * | 1/1998 | Eberhard et al. | 711/216 |
| 5,751,990 A | * | 5/1998 | Krolak et al. | 711/207 |
| 6,205,531 B1 | * | 3/2001 | Hussain | 711/207 |
| 6,490,671 B1 | * | 12/2002 | Frank et al. | 711/207 |
| 6,567,907 B1 | * | 5/2003 | Aglietti et al. | 711/206 |
| 7,073,044 B2 | * | 7/2006 | Willis et al. | 711/208 |
| 2003/0226123 A1 | * | 12/2003 | Thompson et al. | 716/4 |

* cited by examiner

Primary Examiner—Hyung Sough
Assistant Examiner—Anton Rabovianski
(74) Attorney, Agent, or Firm—Park, Vaughan & Fleming LLP; Edward J. Grundler

(57) ABSTRACT

One embodiment of the present invention provides a system that logically partitions different classes of translation lookaside buffer (TLB) entries within a single caching structure. Upon receiving a request to lookup an address translation, the system applies a hash function to parameters associated with the request to determine a corresponding location in the single caching structure where a TLB entry for the request can reside. If the corresponding location contains a TLB entry for the request, the system returns data from the TLB entry to facilitate the address translation. This hash function partitions the single caching structure so that different classes of TLB entries are mapped to separate partitions of the single caching structure. In this way, the single caching structure can accommodate different classes of TLB entries at the same time.

21 Claims, 3 Drawing Sheets

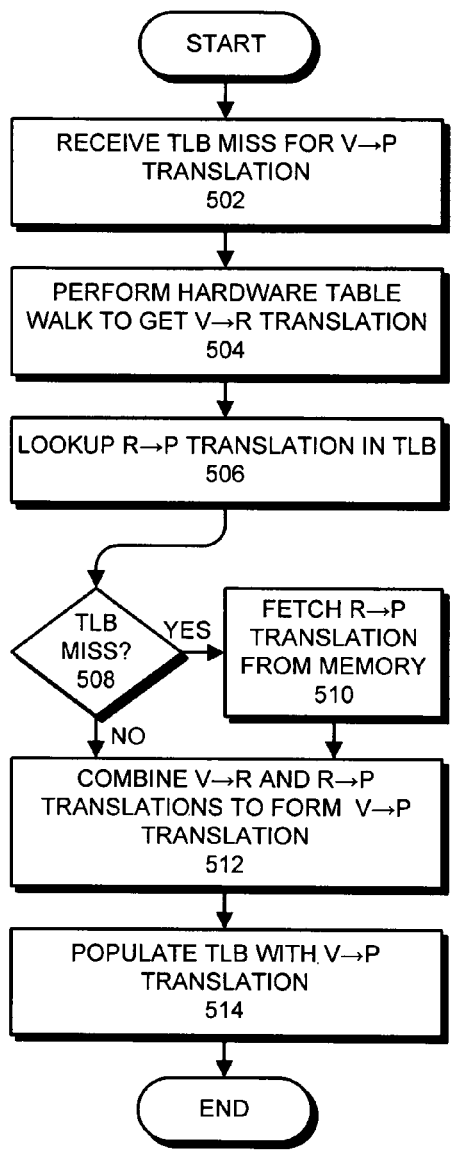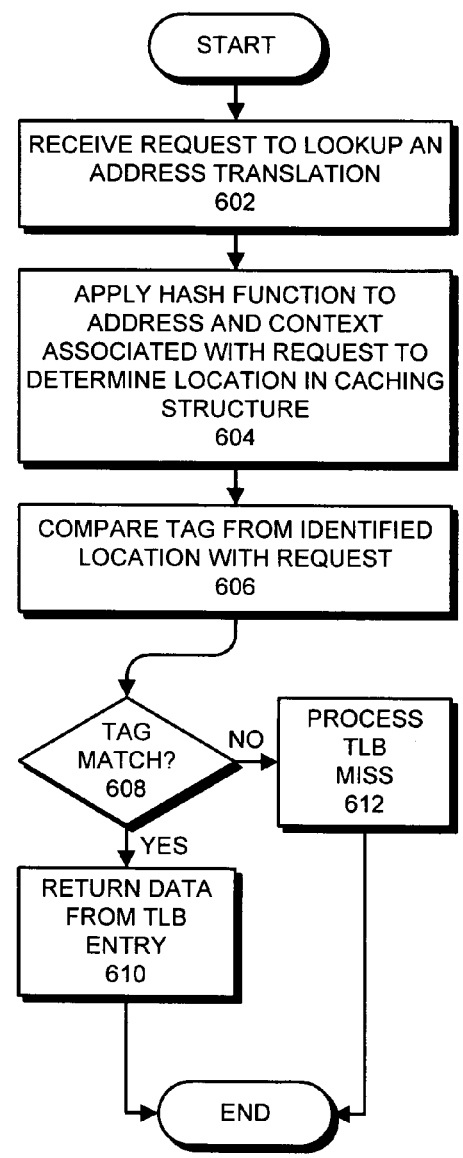
FIG. 5                    FIG. 6

LOGICALLY PARTITIONING DIFFERENT CLASSES OF TLB ENTRIES WITHIN A SINGLE CACHING STRUCTURE

BACKGROUND

1. Field of the Invention

The present invention relates generally to computer system design. More specifically, the present invention relates to a method and an apparatus that facilitates logically partitioning different classes of translation lookaside buffer (TLB) entries within a single large caching structure.

2. Related Art

In order to support virtual addressing, modern computer systems typically include a translation lookaside buffer (TLB), which is typically structured as a small fully-associative cache that stores frequently used mappings from virtual addresses to physical addresses. By accessing the TLB, the computer system can quickly translate virtual addresses to physical addresses, without having to wait for page table entries (containing virtual-to-physical address translations) to be retrieved from main memory.

As computer systems begin to include multiple processors, some computer systems are beginning to support more-sophisticated forms of virtual addressing. For example, some multiprocessor systems support three types of addresses: (1) virtual addresses, which are associated with specific threads; (2) real addresses, which are associated with specific processors; and (3) physical addresses, which identify locations in physical memory (main memory).

To achieve acceptable performance in such systems, it is desirable to support TLB lookups for both real-to-physical address translations and virtual-to-physical address translations. This can be accomplished by providing separate caching structures (TLBs) for the different types of translations. However, providing separate caching structures for the different types of translations can consume a large amount of chip area because data paths must be routed to the separate structures.

This chip area problem can be alleviated by storing different classes of TLB entries within a single TLB. For example, a single TLB can be used to store entries for both real-to-physical address translations and virtual-to-physical address translations. However, this can cause performance problems, because if one class of TLB entries is accessed more frequently than the other class of TLB entries, the less frequently accessed class of TLB entries will tend to get evicted from the TLB. This will cause a high frequency of TLB misses (and resulting performance degradation) for the less frequently accessed class of TLB entries.

Hence, what is needed is a method and an apparatus for efficiently accessing multiple classes of TLB entries in a computer system without the problems described above.

SUMMARY

One embodiment of the present invention provides a system that logically partitions different classes of translation lookaside buffer (TLB) entries within a single caching structure. Upon receiving a request to lookup an address translation, the system applies a hash function to parameters associated with the request to determine a corresponding location in the single caching structure where a TLB entry for the request can reside. If the corresponding location contains a TLB entry for the request, the system returns data from the TLB entry to facilitate the address translation. This hash function partitions the single caching structure so that different classes of TLB entries are mapped to separate partitions of the single caching structure. In this way, the single caching structure can accommodate different classes of TLB entries at the same time.

In a variation of this embodiment, the different classes of TLB entries include: (1) a class of TLB entries for virtual-to-physical address translations, which translate a virtual address for a specific thread to a corresponding address in physical memory; and (2) a class of TLB entries for real-to-physical address translations, which translate a real address, associated with a specific processor in a multiprocessor system, to a corresponding address in physical memory.

In a further variation, the hash function maps a TLB entry for a real-to-physical address translation to a lower-address portion of the single caching structure. Furthermore, the hash function attempts to map a TLB entry for a virtual-to-physical address translation to the entire single caching structure. If this attempt collides with the lower-address portion of the single caching structure, the hash function remaps the TLB entry to a higher-address portion of the single caching structure.

In a variation of this embodiment, the hash function is applied to: an address-to-be-translated, and context information associated with the request.

In a further variation, applying the hash function involves computing a hash index by performing exclusive-OR operations between bits of the address-to-be-translated and the context information.

In a variation of this embodiment, the hash function partitions the single caching structure so that operations associated with different classes of TLB entries do not interfere with each other.

In a variation of this embodiment, the hash function partitions the single caching structure so that different classes of TLB entries can be mapped to partitions of differing size.

In a variation of this embodiment, the single caching structure is associated with a memory management unit (MMU) within a computer system.

BRIEF DESCRIPTION OF THE FIGURES

FIG. 5 presents a flowchart illustrating how a TLB miss is handled during a virtual-to-physical address translation in accordance with an embodiment of the present invention.

FIG. 6 presents a flowchart illustrating how a TLB access takes place in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor System

Figure 1:
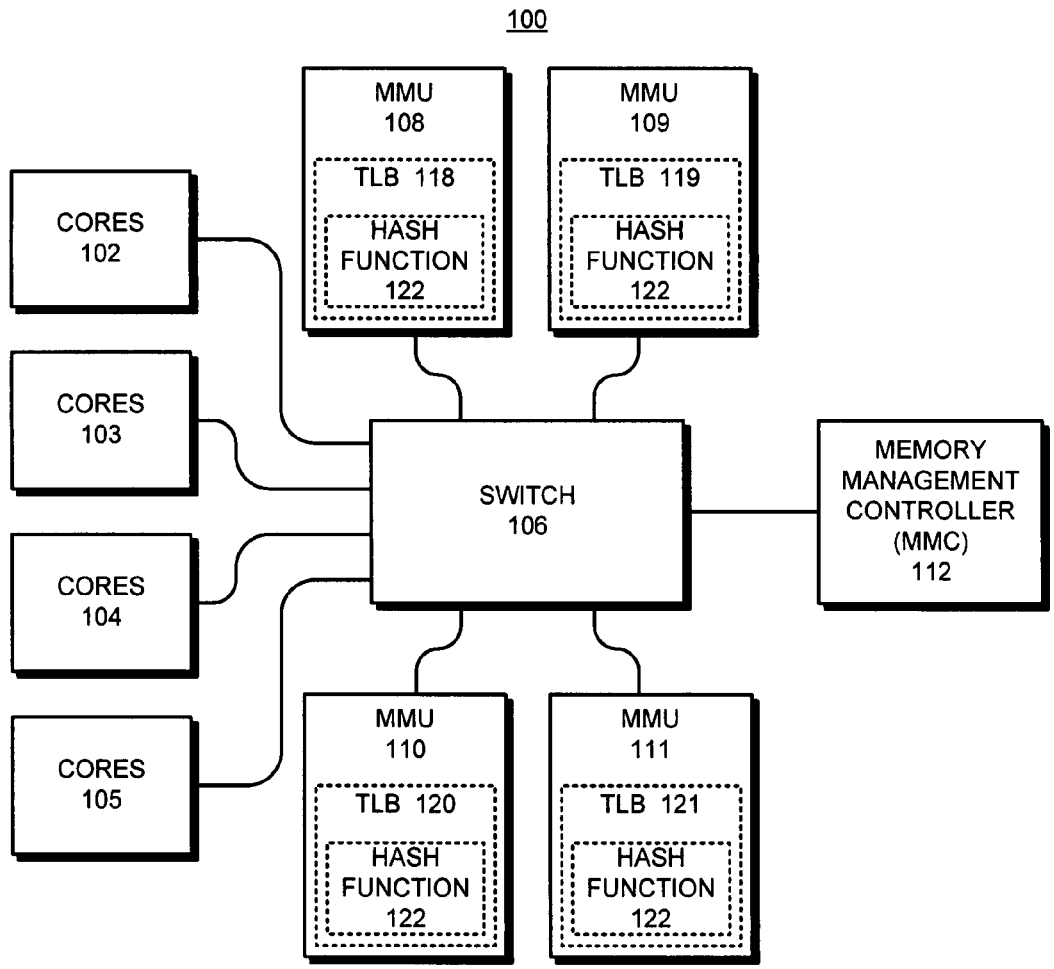
FIG. 1 illustrates a multiprocessor system in accordance with an embodiment of the present invention.

FIG. 1 illustrates a multiprocessor system 100 in accordance with an embodiment of the present invention. As is illustrated in FIG. 1, multiprocessor system 100 includes a number of chips (or modules) containing processor cores 102-105. In one embodiment of the present invention, each of these chips (or modules) can contain multiple "microcores." Cores 102-105 are coupled to physical memory through a switch 106.

Switch 106 allows cores 102-105 to communicate with a memory management controller (MMC) 112. MMC 112 in turn communicates with individual memory management units (MMUs) 108-111, wherein each MMU is associated with a different bank of physical memory (not shown).

Each MMU includes a TLB, which stores commonly used address translations. More specifically, MMU 108 includes TLB 118; MMU 109 includes TLB 119; MMU 110 includes TLB 120; and MMU 111 includes TLB 121. Each of these TLBs 118-121 is a single unified caching structure that supports partitioning different classes of TLB entries as is described with reference to FIGS. 2-6 below. Note that these TLBs 118-121 can include a hash function module 122.

Although the present invention is described in the context of the multiprocessor system illustrated in FIG. 1, the present invention is not meant to be limited to such a system. In general, the present invention can be used in any computer system which supports multiple classes of TLB entries.

TLB Fields

Each TLB 118-121 in FIG. 1 is a caching structure containing TLB entries, wherein each TLB entry includes a tag portion and a data portion. These caching structures can be fully associative, set-associative or direct-mapped.

Figure 2A:
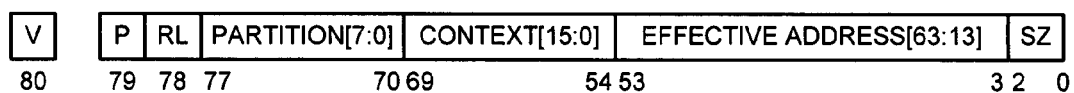
FIG. 2A illustrates TLB tag fields in accordance with an embodiment of the present invention.

Referring to FIG. 2A, the TLB tag fields can include: (1) a valid bit [80], which indicates whether the TLB entry is valid; (2) a parity bit [79], which maintains parity for the tag; (3) an RL bit [78], which indicates whether the TLB entry is for a real-to-physical translation; (4) a partition ID [77:70] which is associated with all translation matches; (5) a context identifier [69:54] for virtual-to-physical translations; (6) and bits 63 through 13 of an effective address [53:3]; and finally, (7) a page size field [2:0], which indicates how large the corresponding page is.

Figure 2B:
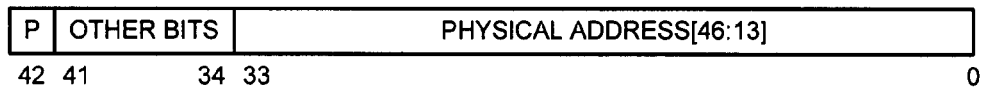
FIG. 2B illustrates TLB data fields in accordance with an embodiment of the present invention.

Referring to FIG. 2B, the TLB data fields include: (1) a parity bit [42], which maintains parity for the data; (2) a number of other fields [41:34], which are not relevant to TLB partitioning and will not be described further; and (3) bits 46 through 13 of the physical address [33:0].

TLB Partitions

Figure 3:
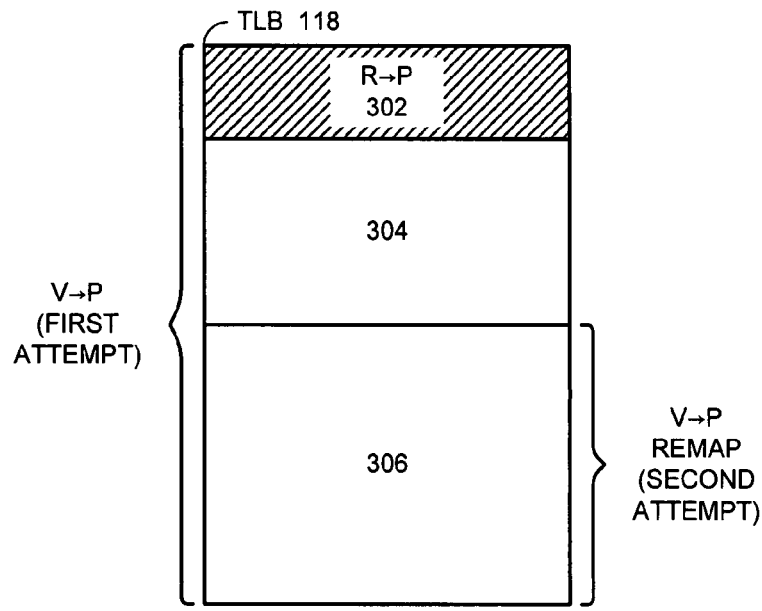
FIG. 3 illustrates how a TLB is partitioned in accordance with an embodiment of the present invention.

FIG. 3 illustrates how a TLB 118 is partitioned in accordance with an embodiment of the present invention. The lower-order partition 302 of TLB 118 is dedicated to real-to-physical address translations. Note that real-to-physical (R→P) entries can be mapped to this partition by zeroing out the higher-order bits of a hash index so that the entries fall within this lower-order partition.

The rest of TLB 118 is dedicated to virtual-to-physical (V→P) address translations. This can be accomplished by first attempting to map virtual-to-physical translations to the entire TLB 118.

If this first attempt collides with the real-to-physical partition, the system remaps the virtual-to-physical translation to the upper half of TLB 110 by remapping the hash index and then setting the highest order bit the resulting hash index. This process is described further in the following section.

Hash Index Generation

Figure 4:
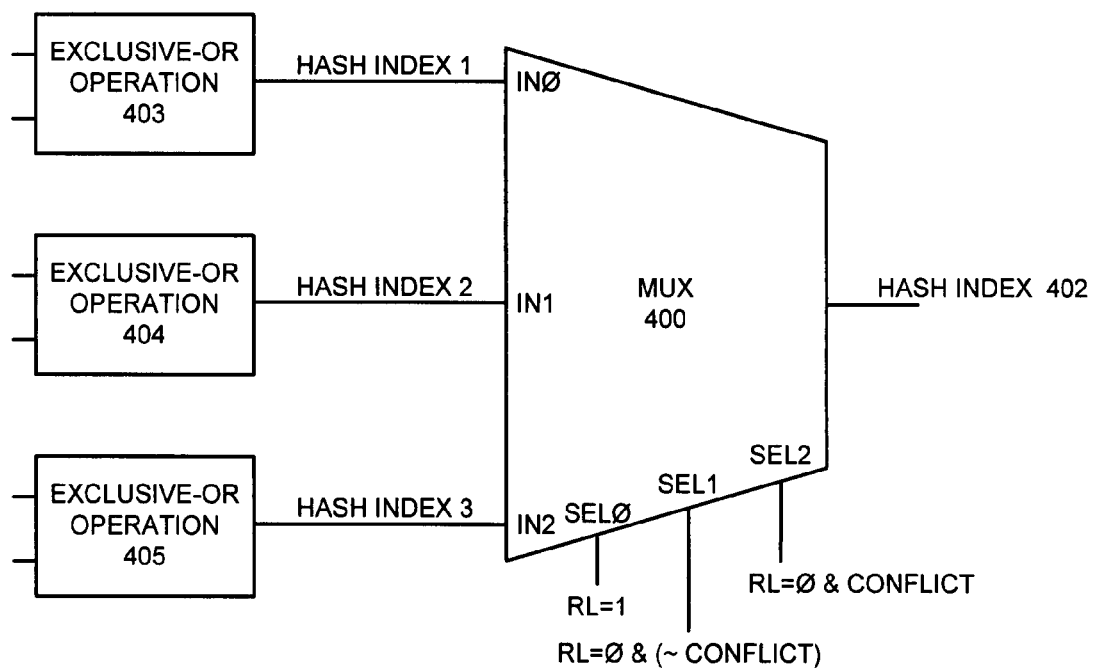
FIG. 4 illustrates a circuit that selects a hash index in accordance with an embodiment of the present invention.

FIG. 4 illustrates a circuit that selects a hash index in accordance with an embodiment of the present invention. This circuit includes a multiplexer 400, which selects a hash index from three possible hash indices generated through different hashing techniques and exclusive-OR operations 403-405 between bits of the address-to-be-translated and other context information.

Hash index 1 is selected if the RL bit=1, which indicates that that the TLB access is for a real-to-physical address translation. Hash index 1 is generated by exclusive-ORing private context information associated with the request with address bits from the request. Furthermore, the higher-order bits of hash index 1 are zeroed out so the index falls within the lower-order partition of the TLB.

Hash index 2 is selected if: (1) the RL bit=0, which indicates that that the TLB access is for a virtual-to-physical address translation; and (2) if there is no conflict between hash index 2 and the lower-order partition 302 of TLB 118, which is reserved for real-to-physical translations. Hash index 2 is generated by exclusive-ORing bits of shared context information with address bits from the request. Note that hash index 2 attempts to map the virtual-to-physical translation to the entire TLB.

If this attempt collides with the real-to-physical partition, the system remaps the translation to the upper-half of the TLB. This involves remapping the hash index by exclusive-ORing different bits of the shared context information and different bits of address bits. It also involves setting the highest-order bit of the hash index to produce hash index 3 which falls in the upper-half of the TLB.

TLB Miss

FIG. 5 presents a flowchart illustrating how a TLB miss is handled during a virtual-to-physical address translation (in a system that supports virtual, real and physical addresses) in accordance with an embodiment of the present invention. In this system, the single TLB stores entries for both virtual-to-physical address translations and real-to-physical address translations.

First, the system receives a TLB miss while processing a virtual-to-physical address translation (step 502). Next, the system performs a hardware table walk to obtain a virtual-to-real address translation (step 504).

The system then looks up the real-to-physical address translation in the same TLB (step 506). If this lookup causes a TLB miss, the system fetches the real-to-physical address translation from a corresponding real-to-physical address page table in main memory (step 510).

Next, after the real-to-physical address translation has been obtained from the TLB in step 506 (or from memory in step 510), the system combines the virtual-to-real address translation obtained in step 504 with the real-to-physical address translation to form a virtual-to-physical address translation (step 512).

Next, the system uses the newly created virtual-to-physical address translation to populate a corresponding entry in the TLB (step 514).

TLB Access

FIG. 6 presents a flowchart illustrating how a TLB access takes place in accordance with an embodiment of the present invention. This TLB access can be either for a virtual-to-physical address translation, or for a real-to-physical address translation.

First, the system receives a request to lookup an address translation in the TLB (step 602). Next, the system applies a hash function to an address and to context information associated with the request to produce a hash index, which identifies a location in the caching structure (step 604). Note that this hash function partitions the single caching structure so that different classes of TLB entries are mapped to separate partitions of the single caching structure. In this way, the single caching structure can accommodate different classes of TLB entries at the same time.

Next, the system compares a tag from the identified location with the request (step 606). If there is a tag match between the tag and the request, the system returns data contain address translation information from the TLB entry (step 608). Otherwise, the system processes a TLB miss (step 612).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for logically partitioning different classes of translation lookaside buffer (TLB) entries in a single caching structure, comprising:
   receiving a request to lookup an address translation in the single caching structure;
   applying a hash function to parameters associated with the request to determine a corresponding location in the single caching structure where a TLB entry for the request can reside;
   if the corresponding location contains a TLB entry for the request, returning data from the TLB entry to facilitate the address translation;
   wherein the hash function partitions the single caching structure so that different classes of TLB entries are mapped to separate partitions of the single caching structure, whereby the single caching structure can accommodate different classes of TLB entries at the same time;
   wherein the different classes of TLB entries include:
      a class of TLB entries for virtual-to-physical address translations, which translate a virtual address for a specific thread to a corresponding address in physical memory; and
      a class of TLB entries for real-to-physical address translations, which translate a real address, associated with a specific processor in a multiprocessor system, to a corresponding address in physical memory; and
   producing an address in physical memory in response to the request.

2. The method of claim 1,
   wherein the hash function maps a TLB entry for a real-to-physical address translation to a lower-address portion of the single caching structure;
   wherein the hash function first attempts to map a TLB entry for a virtual-to-physical address translation to the entire single caching structure, and if the first attempt collides with the lower-address portion of the single caching structure, the hash function remaps the TLB entry to a higher-address portion of the single caching structure.

3. The method of claim 1, wherein the hash function is applied to:
   an address-to-be-translated; and
   context information associated with the request.

4. The method of claim 3, wherein applying the hash function involves computing a hash index by performing exclusive-OR operations between bits of the address-to-be-translated and the context information.

5. The method of claim 1, wherein the hash function partitions the single caching structure so that operations associated with different classes of TLB entries do not interfere with each other.

6. The method of claim 1, wherein the hash function partitions the single caching structure so that different classes of TLB entries can be mapped to partitions of differing size.

7. The method of claim 1, wherein the single caching structure is associated with a memory management unit (MMU) within a computer system.

8. An apparatus that logically partitions different classes of translation lookaside buffer (TLB) entries in a single caching structure, comprising:
   the single caching structure, which is configured to receive a request to lookup an address translation;
   a lookup mechanism configured to apply a hash function to parameters associated with the request to determine a corresponding location in the single caching structure where a TLB entry for the request can reside;
   wherein if the corresponding location contains a TLB entry for the request, the lookup mechanism is configured to return data from the TLB entry to facilitate the address translation;
   wherein the hash function partitions the single caching structure so that different classes of TLB entries are mapped to separate partitions of the single caching structure, whereby the single caching structure can accommodate different classes of TLB entries at the same time;
   wherein the different classes of TLB entries include:
      a class of TLB entries for virtual-to-physical address translations, which translate a virtual address for a specific thread to a corresponding address in physical memory; and
      a class of TLB entries for real-to-physical address translations, which translate a real address, associated with a specific processor in a multiprocessor system, to a corresponding address in physical memory; and
   a producing mechanism configured to produce an address in physical memory in response to the request.

9. The apparatus of claim 8,
   wherein the hash function maps a TLB entry for a real-to-physical address translation to a lower-address portion of the single caching structure;
   wherein the hash function first attempts to map a TLB entry for a virtual-to-physical address translation to the entire single caching structure, and if the first attempt collides with the lower-address portion of the single caching structure, the hash function remaps the TLB entry to a higher-address portion of the single caching structure.

10. The apparatus of claim 8, wherein the hash function is applied to:
an address-to-be-translated; and
context information associated with the request.

11. The apparatus of claim 10, wherein while applying the hash function, the lookup mechanism is configured to compute a hash index by performing exclusive-OR operations between bits of the address-to-be-translated and the context information.

12. The apparatus of claim 8, wherein the hash function partitions the single caching structure so that operations associated with different classes of TLB entries do not interfere with each other.

13. The apparatus of claim 8, wherein the hash function partitions the single caching structure so that different classes of TLB entries can be mapped to partitions of differing size.

14. The apparatus of claim 8, wherein the single caching structure is associated with a memory management unit (MMU) within a computer system.

15. A computer system including a single caching structure that logically partitions different classes of translation lookaside buffer (TLB) entries, comprising:
at least one processor;
a physical memory;
the single caching structure, which is configured to receive a request to lookup an address translation;
a lookup mechanism configured to apply a hash function to parameters associated with the request to determine a corresponding location in the single caching structure where a TLB entry for the request can reside;
wherein if the corresponding location contains a TLB entry for the request, the lookup mechanism is configured to return data from the TLB entry to facilitate the address translation;
wherein the hash function partitions the single caching structure so that different classes of TLB entries are mapped to separate partitions of the single caching structure, whereby the single caching structure can accommodate different classes of TLB entries at the same time;
wherein the different classes of TLB entries include:
a class of TLB entries for virtual-to-physical address translations, which translate a virtual address for a specific thread to a corresponding address in physical memory; and
a class of TLB entries for real-to-physical address translations, which translate a real address, associated with a specific processor in a multiprocessor system, to a corresponding address in physical memory; and
a producing mechanism configured to produce an address in physical memory in response to the request.

16. The computer system of claim 15,
wherein the hash function maps a TLB entry for a real-to-physical address translation to a lower-address portion of the single caching structure;
wherein the hash function first attempts to map a TLB entry for a virtual-to-physical address translation to the entire single caching structure, and if the first attempt collides with the lower-address portion of the single caching structure, the hash function remaps the TLB entry to a higher-address portion of the single caching structure.

17. The computer system of claim 15, wherein the hash function is applied to:
an address-to-be-translated; and
context information associated with the request.

18. The computer system of claim 17, wherein while applying the hash function, the lookup mechanism is configured to compute a hash index by performing exclusive-OR operations between bits of the address-to-be-translated and the context information.

19. The computer system of claim 18, wherein the hash function partitions the single caching structure so that operations associated with different classes of TLB entries do not interfere with each other.

20. The computer system of claim 15, wherein the hash function partitions the single caching structure so that different classes of TLB entries can be mapped to partitions of differing size.

21. The computer system of claim 15, wherein the single caching structure is associated with a memory management unit (MMU) within a computer system.

* * * * *